May 17, 1955
H. M. GUINOT
2,708,490
RECOVERY OF CONDENSABLE COMPONENTS
FROM A GAS AND VAPOUR MIXTURE
Filed July 30, 1951
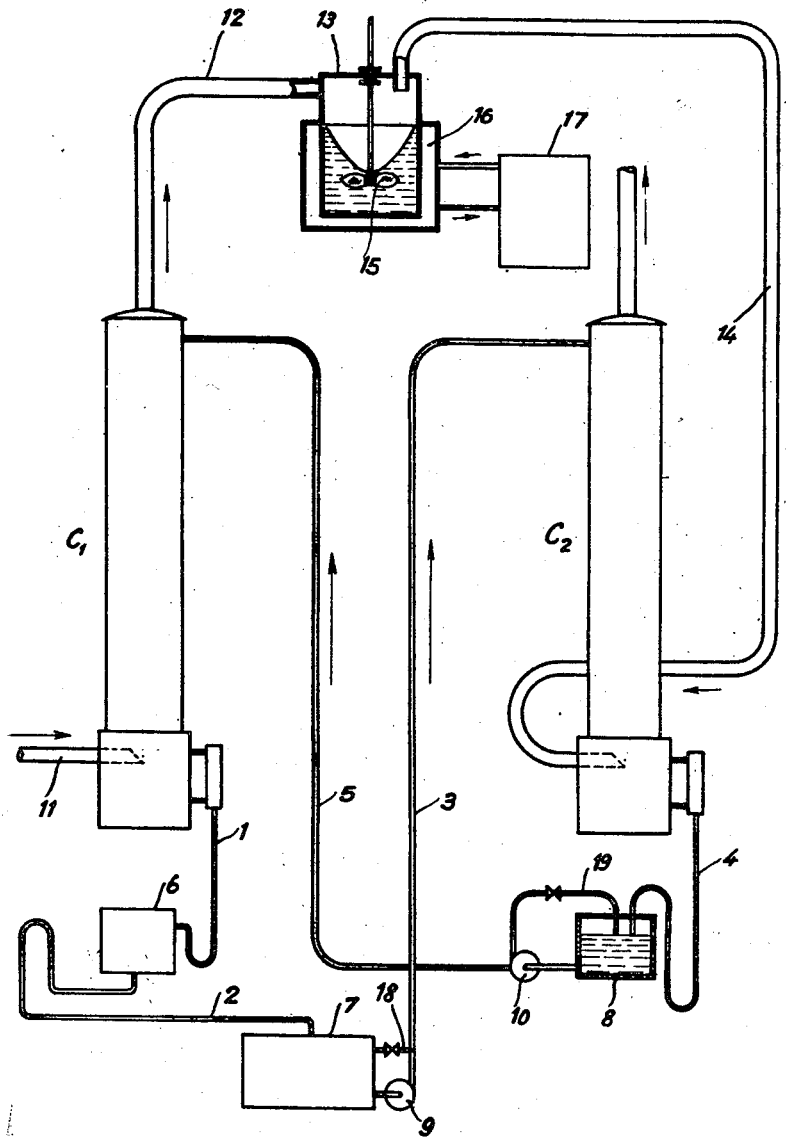
Inventor
Henri Martin Guinot
by Stevens, Davis, Miller & Mosher
his attorneys

United States Patent Office 2,708,490
Patented May 17, 1955

2,708,490

RECOVERY OF CONDENSABLE COMPONENTS FROM A GAS AND VAPOUR MIXTURE

Henri Martin Guinot, Versailles, France

Application July 30, 1951, Serial No. 239,361

Claims priority, application France September 18, 1950

6 Claims. (Cl. 183—114.6)

In order to recover organic compounds contained in the vapour state in a gas, it has been proposed to apply methods such as scrubbing by means of solvents, adsorption by active carbon or the action of low temperature.

In the processes falling in this last category, it is essential—in order to obtain economic working—to employ heat-exchangers which utilise as much as possible, in the cooling of the gas to be treated, the cooling effect of the exhausted gas leaving the apparatus.

The surface heat-exchangers currently employed in industry have the disadvantages of possessing low heat-exchange coefficients, especially when crystals of ice or of organic compounds are deposited on the walls in contact with the fresh gas. It is therefore necessary from time to time to reverse the direction of the gaseous current or to introduce hot gas to bring about melting of the ice or crystals deposited on the walls of the exchangers. In any case, the exchange coefficients are poor, being of the order of 10 to 20 calories per degree, square metre and hour, during the whole of the period when deposition occurs that is to say, during the major portion of the time of use.

In order to overcome these disadvantages, it has been proposed to use batteries of vats or scrubbers in which there is employed an auxiliary inert liquid by means of which the gas to be treated can be rapidly cooled to substantially the same temperature as said liquid. Though advantageous this method does not solve the important general practical problem of the treatment of the gases which give rise to partial condensations at the time of the initial cooling of the entering gas by the exhaust gas. The main object of the present invention is to overcome this defect.

According to the present invention a process for recovering from a gaseous composition vapourous constituents which may be separated therefrom by condensation at low temperature comprises passing the gaseous composition in succession through a first treatment zone, a refrigerating zone in which the vapourous constituents are condensed to liquid and are separated, and a second treatment zone, and continuously cycling through the said second treatment zone and said first treatment zone in counter-current to the said gaseous composition a liquid which is chemically inert with respect to the gaseous composition and does not freeze at temperature obtaining in the said treatment zones, provision being made for heat exchange between the said liquid and the said gaseous composition in each of the said treatment zones and any condensate carried by the said liquid from the first treatment zone being separated from the said liquid before it re-enters the second treatment zone.

By means of the foregoing arrangement the gas leaving the refrigerating unit is passed through the second treatment zone and has the effect of cooling the liquid which is flowing through the second treatment zone in counter-current to it. This cooling liquid in passing through the first treatment zone in turn cools the gas entering the first treatment zone. Thus the most efficient utilisation of the refrigeration is effected; the incoming fresh gas is subject to preliminary cooling by the liquid before it reaches the refrigeration zone and the exhaust gases from the refrigeration zone in turn cool the circulating liquid entering the second treatment zone.

In order to ensure a satisfactory heat exchange between the liquid and the gas the liquid or gas is preferably finely sub-divided in its passage through the treatment zones so as to present a large heat exchange surface.

In the refrigerating zone the greatest part of the vapourous constituents are condensed and separated. It is convenient to effect the refrigeration with the aid of a second inert liquid which entrains or dissolves the condensate, a portion of this liquid being continuously withdrawn from the refrigerating zone, treated for separation of the condensate and returned thereto. In order to avoid confusion, hereinafter the liquid which is cycled through the two treatment zones is identified as liquid A while that used in the refrigeration zone (if such liquid is used) is identified as liquid B.

The essential advantage of the process of this invention may be restated as follows: once the gas has been subjected to the most energetic cooling and it has given up (in the condensate state or in the form of solution in the second auxiliary liquid B) practically all the vapours which it carried, it is brought into contact, with a view to the utilization of its coldness, with the first auxiliary liquid A. Since liquid A has been deprived of the condensate with which it was charged in the first treatment zone, the gas, on being re-heated by the first liquid A in the second treatment zone, is not capable of re-vapourising any condensate before being withdrawn evacuate. Moreover, if this gas carries a residue of vapours having escaped condensation in the refrigeration zone such vapours will generally be condensed, at the inlet of the gas into the second treatment zone, since on account of the counter-current, it is in this region that the liquid A leaves and is the coldest, and the condensate thus collected would be brought by the liquid A into the first treatment zone.

The invention includes apparatus for carrying out the process of the invention which comprises a first treatment chamber, a refrigerating unit, a means for separating condensate from said refrigerating unit, a second treatment zone, a condensation unit, means for cycling liquid through the second treatment zone, the first treatment zone and the condensation unit in that succession, means for passing gas through said first treatment zone said refrigerating unit and said second treatment zone in that succession, and means within said treatment zones for enabling an efficient interchange of heat between the liquid and gas passing countercurrent through said zones.

One form of apparatus according to the invention is illustrated in the accompanying drawing, which is only given as a non-limitative example, the features which are apparent both from the drawing and the description forming part of the present invention.

In order to facilitate the explanation, it will be assumed that the invention is to be applied to the solving of a simple problem, for example, that of removing benzol from gas, e. g. that an illuminating gas is to be treated which contains 55 g. per cubic metre of benzene and homologues, supplied at a temperature of 20° C. and supposedly saturated with water.

In the installation shown diagrammatically in the accompanying drawing, the two heat exchange zones are defined by plate columns $C_1$ and $C_2$ of a particular type which will be hereinafter described. The circuit provided for the auxiliary liquid A comprises the column $C_1$ and the pipe lines 1, 2, 3, 4, 5 which connect, step by step, the base of the column $C_1$ to a condensate separator 6, the separator 6 to an intermediate vat 7, the vat 7 to the top of the column $C_2$, the bottom of the latter to an intermediate vat 8, and the vat 8 to the top of the column $C_2$.

One or more propulsion means are included in the circuit in order to assure the circulation of the first auxiliary liquid and, in this example, two have been shown, in the form of pumps 9 and 10, sucking the liquid from each of the vats 7 and 8. Branches or by-passes 18 and 19 are provided equipped with cocks or valves enabling the quantity of liquid effectively forced into the pipes 3 and 5, respectively to be regulated.

Opening into the base of the column $C_1$ is the supply pipe 11 for the gas to be treated, and leaving the top is a pipe 12 for supplying the gas to a refrigerating condensation apparatus 13; leaving the latter is a pipe 14 for conveying the gas to the bottom of the column $C_2$.

The refrigeration condensation apparatus 13 contains a body of a second auxiliary liquid B and is provided with an arrangement which permits the formation of an emulsion of the gas which enters this liquid. It is also provided with low temperature refrigerating means. Liquid B is preferably a liquid which is incapable of freezing at the low temperatures which are applied, has solvent properties with regard to the substances carried in the vapour state by the gas and, in addition, boils at a temperature higher than the boiling points of the substances in question. In the particular case of the illuminating gas given here by way of example, it is possible to employ, as the second auxiliary liquid B, crude benzol deprived of its benzene fraction; it is also possible to use higher homologues of benzenes, particularly fractions having a boiling point higher than that of xylenes, for example, "naptha-solvent" fractions of boiling point exceeding 150° C.; as auxiliary liquids capable of being used alone or in admixture, there may be mentioned the ethyl-benzenes, methyl-benzenes, paracymene, tetrahydro-naphthalene and decahydro-naphthalene.

The arrangement permitting the emulsifying of the gas in the liquid may, as indicated diagrammatically at 16, be an agitator driven at high speed for producing a cavitation.

The refrigeration means may comprise means for indirect heat exchange with a cold fluid, for example, an external cooling jacket 16 coupled to a refrigerating apparatus 17 with circulation of fluid between 16 and 17; as a modification or as an addition, a part of the auxiliary liquid B may be drawn off continuously from the apparatus 13, sent to an exchanger such as a plate exchanger and restored in the cold state to the apparatus 13.

In any case, part of the auxiliary liquid B (which may be the same as or different from the part referred to in the preceding paragraph) is withdrawn continuously, the condensed vapours are separated and the residue returned to the apparatus 13.

In apparatus 13, the separation of the vapours which it is proposed to recover is brought substantially to completion (namely, benzene vapours and its homologues in the particular case under consideration); however the problem of recovering cold from the dehydrated debenzoled gas has not been solved so far.

The recovery is carried out in column $C_2$, to which the cold gas for example, at $-30°$ C. in the particular case selected, is supplied by the pipe 14 which is preferably as short as possible and well heat-insulated.

The first auxiliary liquid A, which the gas meets in the column $C_2$, is preferably a liquid which is without solvent properties with respect to the substances present in the vapour state in the gas to be treated and is incapable of freezing at the lowest temperatures to which it is subjected in the circuit; it is also desirable that this liquid should have a high specific heat. There are preferably employed non-freezing aqueous solutions of mineral salts (calcium chloride or similar substances, nitrates, and the like) or low volatile organic compounds (glycols, glycol ethers such as the lower alkyl mono-ethers of ethylene glycols and polyethylene glycols, and the like).

The column $C_2$ is preferably a well heat-insulated column which is sprayed with this auxiliary liquid A at the top thereof.

The body of the column must be arranged in such manner that it permits a good dispersion of the gas rising in the descending liquid in order to ensure an almost instantaneous heat balancing between the two fluids.

For example, there is obtained a very efficient assembly by using plates of sintered metal which cause the gas to be divided into a large number of small bubbles traversing the layer of auxiliary liquid A existing on each plate, the thickness of said layer being regulated by the height of the overflows placed on each plate as in an ordinary distillation column. It is desirable that the plates or at least groups of plates be thermally insulated from one another. For this purpose, it is possible to place thick joints of heat-insulating material, for example, asbestos, between the assembly flanges of two consecutive sections of the column.

Under these conditions, the auxiliary liquid A arriving at the top of the column $C_2$ at about normal temperature, for example, in the region of $+20°$ C., flows from plate to plate, meeting gas which is colder and colder. The liquid is almost immediately cooled down to the temperature of the gas and if the delivery of liquid is suitably regulated, taking into account the specific heat of the constituents and the rate of delivery of cold gas, the auxiliary liquid A upon leaving the base of column $C_2$ is at a temperature in the region of $-30°$ C., having been cooled both by the incoming cold gas and the vapourisation of a small quantity of water corresponding to rehydration of said liquid.

It is apparent that the coldness of the auxiliary liquid A can be imparted to the fresh gas to be treated in the column $C_1$, if the latter is operated in a manner identical to that which has just been described with reference to column $C_2$. For this purpose, the gas to be treated is sent through the pipe 11 to the base of the column $C_1$, constructed like the column $C_2$, and the said column $C_1$ is sprayed at the top with the cold liquid leaving the base of $C_2$. There is again an immediate thermal balancing between the gas and the liquid by bubbling on the plates, but there is, in this case, a complication due to the partial condensation of the vapours contained in the gas specifically of water, benzene and benzene homologue vapours in the particular case selected.

This condensation is produced on the upper plates which are coldest but, as the gas entering at the base of the column $C_1$, at a temperature of for example 20° C. is neither saturated with water nor saturated with benzene, it causes the condensate formed on the upper plates to revaporise on the bottom plates of the column. After operating for a certain time, equilibrium is established and all the coldness of auxiliary liquid A will then be utilised, partly for condensing a portion of the vapourous constituent of the gas (for example, water vapours and benzene vapours) and partly for cooling the gas which is entering. With a well heat-insulated column and the working conditions which have been set out above by way of example, for each cubic metre of fresh gas, about 17.5 g. water and 31 g. benzene are condensed, while the gas is at the same time cooled to a temperature in the region of $-20°$ C., the first auxiliary liquid being assumed to be at $-30°$ C. when it is conducted through the pipe 5. The condensed water passes into the auxiliary liquid and dilutes it slightly; the other substances initially in a vapour state, for example, benzene and its homologues, being insoluble in this liquid as has been predicated, are separated into a layer, for example, the upper layer if the liquid is allowed to settle. It is for this purpose that the decanting arrangement 6 has been provided from which the upper layer is withdrawn while the lower layer reaches the vat 7 through the pipe 2.

However, it must be understood that the process is not limited to the use, as first auxiliary liquid, of a liquid allowing a simple separation, by decantation, of the substances conveyed by the gas in a vapour state. The decanting arrangement 6 is therefore only given as a particular example of an apparatus or installation for separating the substances in question from the first auxiliary liquid. Such an installation may also comprise, for example, a distilling apparatus for this separation. The distillation intended to separate the condensate which has not been decanted is only carried out on a portion of the circulating auxiliary liquid, the object being to withdraw from the circuit a sufficient quantity of condensate in order to avoid its unlimited accumulation.

The auxiliary liquid A leaving the separator 6 is then sent back to the top of the column 2; if necessary, it is possible, beforehand and as required, to concentrate or dilute it from time to time or continuously, in order to restore it to its initial concentration and composition, more especially in order that it maintains its character of being a non-freezing liquid.

In certain cases, as in that of the selected example for the initial gas, benzene crystals remain in the auxiliary liquid A in the body of the column $C_1$, but since said liquid is agitated by the bubbling of the gas, this does not present any inconvenience. Moreover, it is also possible to incorporate in the first auxiliary liquid, a proportion of a high-boiling substance product capable of acting as a powerful solvent of benzene and of thus preventing the crystallisation of the latter from taking place. In this case, it is sufficient to carry out a simple fractional distillation of the layer decanted at 6; the condensed benzene is then separated, while the high-boiling solvent is recovered and used again.

The refrigeration condensation apparatus instead of being of the type described above with reference to the drawing, may be a column of the same type as the columns $C_1$ and $C_2$. The pipe 12 then opens into the base of this column and the pipe 14 starts from the top thereof. For the second auxiliary liquid B, there is formed a particular circuit comprising, in addition to the third column, a heat exchanger and a circulation pump or equivalent means which brings the liquid in spray form to the top of this column and recovers it at the base. The heat exchanger may comprise a chamber in which are immersed coils connected with a refrigerating apparatus, or as a modification or complementary thereto, a plate-type exchanger, that is to say, an exchanger in which the liquid is spread several times in thin layers in order to give up its heat to similar layers of a refrigerating fluid through the exchange walls.

As stated above, the second auxiliary liquid B is preferably a liquid having solvent properties with respect to the substances present in the vapour state in the initial gas. However, it is also possible to use a liquid which does not possess this property, and in particular a non-freezing aqueous liquid such as that which is preferably employed in the columns $C_1$ and $C_2$.

The efficiency of the process according to the present invention is improved if the process is carried out at super-atmospheric pressure because it is possible to increase the delivery of gas through the installation in a manner substantially proportional to the excess of pressure, all conditions being otherwise the same. The heat balance is always effected instantaneously between the liquids and the gases; moreover, the losses by radiation are proportionately less.

The process is applicable not only to the removal of benzol from gas or for similar problems, but also to the treatment of gas containing vapours of solvents, hydrocarbons, alcohols and generally of any organic compounds. When these are soluble in the first auxiliary liquid A it is possible either to use distillation (effected only on a fraction of the auxiliary liquid A) for recovering the dissolved products or for regenerating this liquid, or to use a high-boiling solvent which will dissolve the water and the vapours, or even which allows the water to decant and only dissolves the vapours.

In these different cases, the principle is always the same, namely, using an auxiliary liquid (or mixture of liquids) A for effecting the heat exchanges between gases, permitting the substantially total recovery of the coldness imparted to the gas and assisting in the condensation of the vapours of organic compounds to be separated.

The process is thus applicable to the treatment of all gases containing vapours of organic compounds which are liquid at normal temperature; in particular it may be employed for the treatment of the forced air which has served for the ventilation of workshops where cellulose varnishes and paints are applied by a spray-gun or to the treatment of cracking gases containing light fractions of the gasoline boiling range; moreover, in this case as these gases are generally available at a pressure of about 10 kg. sq. cm., the process permits the advantageous separation of hydrocarbons such as butanes and butylenes, which are liquid at the pressure in question.

It is within the scope of the present invention to employ columns or scrubbers of any type such as perforated plate columns or Streader scrubbers for bringing the gases into contact with the auxiliary liquids serving as heat exchangers and indeed any method which permits a methodical and efficient contact of the products which are present may be successfully employed in the present process.

Finally, it should be noted that the accompanying drawing shows diagrammatically only one of the possible embodiments for an installation suitable for carrying the process into effect. It is within the scope of the invention, to adopt a different grouping of the elements of the apparatus, for example in order to shorten the pipes for conveying cold fluids; thus, although separate columns have been shown and described, this has been done only to emphasise the separateness of the treatment zones and it is equally practicable to arrange two such zones in a single column.

What I claim is:

1. A continuous process for separating condensable vapourous components from a gaseous mixture containing the same, which comprises passing said gas mixture through a first zone countercurrently and in direct contact with a cool first liquid which is chemically inert with respect to said gas and unfreezable at temperatures obtaining in said zone, so as to cool said mixture and cause a portion of said vaporous components to be condensed out of said mixture and carried along with said first liquid; passing the cold gas effluent from said first zone through a second zone; contacting said cold gas effluent in said second zone with a cool second liquid which is unfreezable at temperatures obtaining in said second zone; maintaining said second liquid in said second zone at a temperature which is low enough to cause substantially the whole amount of the remainder of said vapourous components to be condensed out of said gas effluent; separating from said first liquid said portion of vapourous components carried along therewith, in a separating zone; passing said gas effluent from said second zone through a third zone countercurrently and in direct contact with said first liquid from said separating zone, so as to cool the same; and recycling said first liquid from the third zone to said first zone.

2. The process of claim 1, said second liquid being a solvent for at least one of said vapourous components.

3. The process of claim 1, further comprising withdrawing a portion of said second liquid from said second zone, separating therefrom any condensed vapourous components carried along therewith, and returning said portion of second liquid to said second zone.

4. The process of claim 1, which further comprises maintaining said second liquid in said second zone in rapidly whirling condition to cause the incoming gaseous mixture to be sucked into and distributed as minute bubbles in said second liquid.

5. An apparatus for continuously separating condensable vapourous components from a gaseous mixture containing the same, which comprises a first countercurrent flow gas-liquid contact unit; a second unit including means for contacting gas with an auxiliary liquid and a cooling device for maintaining said auxiliary liquid at a low temperature; a third countercurrent flow gas-liquid contact unit; means for supplying said gaseous mixture to said first unit; means for feeding the gas effluent from said first unit to said second unit; means for feeding the gas effluent from said second unit to said third unit; means for cycling a further auxiliary liquid through said first and third units successively; and a separator in said auxiliary liquid cycling means, arranged to receive the effluent of said further auxiliary liquid from said first unit and adapted to separate that portion of condensed vapourous components carried along therewith before ingress of said further auxiliary liquid into said third unit.

6. An apparatus for continuously separating condensable vapourous components from a gaseous mixture containing the same, which comprises a first countercurrent flow gas-liquid contact unit; a second gas-liquid contact unit comprising a vessel containing a body of an auxiliary liquid and having a gas inlet and a gas outlet, a turbine rotatably borne therein for maintaining said liquid body in whirling condition to suck gas from said gas inlet and cause the same to be distributed in fine bubbles into said body and a cooling device for maintaining said auxiliary liquid at a low temperature; a third countercurrent flow gas-liquid contact unit; means for supplying said gaseous mixture to said first unit; means for feeding the gas effluent from said first unit to said second unit; means for feeding the gas effluent from said second unit to said third unit; means for cycling a further auxiliary liquid through said first and third units successively; and a separator in said auxiliary liquid cycling means, arranged to receive the effluent of said further auxiliary liquid from said first unit and adapted to separate that portion of condensed vapourous components carried along therewith before ingress of said further auxiliary liquid into said third unit.

References Cited in the file of this patent

UNITED STATES PATENTS

| | | |
|---|---|---|
| 1,724,513 | Pollitzer | Aug. 13, 1929 |
| 2,084,474 | Booth et al. | June 22, 1937 |
| 2,555,060 | Schuftan | May 29, 1951 |
| 2,560,469 | Ogorzaly | July 10, 1951 |
| 2,561,720 | Alleman et al. | July 24, 1951 |